United States Patent [19]
Kitahara

[11] Patent Number: 5,846,131
[45] Date of Patent: *Dec. 8, 1998

[54] INFORMATION STORAGE MEDIUM AND ELECTRONIC DEVICE USING THE SAME FOR AUTHENTICATION PURPOSES

[75] Inventor: Atsushi Kitahara, Tokyo, Japan

[73] Assignee: Sega Enterprises, Ltd., Tokyo, Japan

[*] Notice: This patent issued on a continued prosecution application filed under 37 CFR 1.53(d), and is subject to the twenty year patent term provisions of 35 U.S.C. 154(a)(2).

The term of this patent shall not extend beyond the expiration date of Pat. No. 5,460,374.

[21] Appl. No.: 374,562
[22] PCT Filed: Jul. 28, 1994
[86] PCT No.: PCT/JP94/01243
 § 371 Date: Mar. 30, 1995
 § 102(e) Date: Mar. 30, 1995
[87] PCT Pub. No.: WO95/04352
 PCT Pub. Date: Feb. 9, 1995

[30] Foreign Application Priority Data

Jul. 28, 1993 [JP] Japan .................................. 5-185740

[51] Int. Cl.$^6$ ........................................................ A63F 9/22
[52] U.S. Cl. .............................................. 463/29; 463/43
[58] Field of Search ............................. 273/435; 463/43, 463/44, 29; 369/272, 273, 275.5, 283, 286

[56] References Cited

U.S. PATENT DOCUMENTS

| | | |
|---|---|---|
| 4,462,076 | 7/1984 | Smith, III . |
| 4,860,128 | 8/1989 | Nakagawa . |
| 4,865,321 | 9/1989 | Nakagawa et al. .................... 463/29 |
| 4,967,286 | 10/1990 | Nomula et al. ...................... 358/342 |
| 5,004,232 | 4/1991 | Wang et al. ........................... 463/29 |
| 5,014,982 | 5/1991 | Okada et al. ...................... 463/29 X |

FOREIGN PATENT DOCUMENTS 0 329 122 A3 of 0000 European Pat. Off. .
0 378 385 A3 of 0000 European Pat. Off. .

(List continued on next page.)

OTHER PUBLICATIONS

English Language Abstract No. 2–179941 to Eijiro Ichimura Entitles "Optical Information Recording Medium and its Production".
English Language Abstract No. 1–4933 to Toshimitsu Tanaka Entitled "Optical Information Recording Medium".
Japanese Abstract No. 2–179941 to Eijiro Ichimura Entitled "Optical Information Recording Medium and its Production".
Japanese Abstract No. 1–4933 to Toshimitsu Tanaka Entitled "Optical Information Recording Medium".
Japanese Abstract No. 2–265040 to Shigeru Fujita Entitled "Optical Disk and Stamper for Manufacturing Optical Disk".
Japanese Abstract No. 62–259244 to Minoru Fujita Entitled "Optical Reading Card".

(List continued on next page.)

Primary Examiner—Jessica Harrison
Assistant Examiner—Michael O'Neil
Attorney, Agent, or Firm—Dickstein Shapiro Morin & Oshinsky, LLP

[57] ABSTRACT

Security is ensured by judging agreement with a specific indication, such as a trademark, whose identity is socially recognizable to effectively expel counterfeits from the market. A game machine in which a CD-ROM 17 is mounted on a game machine 10 to play a game based on program information stored in the CD-ROM 17 comprises a recognition sensor 22 reading a trademark indication region 20 on the exterior surface of the CD-ROM 17, and a judging unit judging whether a specific trademark TM is displayed in a trademark indication region, the game based on the program information being prevented from starting, or if started stopped when the specific trademark TM is not displayed.

21 Claims, 13 Drawing Sheets

FOREIGN PATENT DOCUMENTS

| | | |
|---|---|---|
| 0 553 545 A3 | of 0000 | European Pat. Off. . |
| 0 080 244 A2 | 6/1983 | European Pat. Off. . |
| 0 329 122 A2 | 8/1989 | European Pat. Off. . |
| 0 342 748 A1 | 11/1989 | European Pat. Off. . |
| 0 378 385 A2 | 7/1990 | European Pat. Off. . |
| 0 545 472 | 6/1993 | European Pat. Off. ........ G11B 20/00 |
| 0 553 545 | 8/1993 | European Pat. Off. .......... G06F 1/00 |
| 0 553 545 A2 | 8/1993 | European Pat. Off. . |
| 0 643 391 | 3/1995 | European Pat. Off. ........ G11B 23/28 |
| 57-91188 | 6/1982 | Japan . |
| 61-258384 | 11/1986 | Japan . |
| 62-259244 | 11/1987 | Japan ............................. G11B 7/24 |
| 62-279538 | 12/1987 | Japan ............................. G11B 7/26 |
| 64-4933 | 1/1989 | Japan ............................. G11B 7/24 |
| 1-288489 | 11/1989 | Japan ............................ B42D 15/02 |
| 2-9033 | 1/1990 | Japan ............................. G11B 7/24 |
| 2-20884 | 2/1990 | Japan ............................ G11B 23/38 |
| 2-179941 | 7/1990 | Japan .............................. G11B 7/24 |
| 2-35383 | 7/1990 | Japan ............................ G11B 23/40 |
| 2-265040 | 10/1990 | Japan .............................. G11B 7/24 |
| 03122713 | 5/1991 | Japan . |
| 9101358 | 3/1993 | Japan .............................. G11B 7/24 |
| 59-50076 | 1/1994 | Japan . |
| 9101358 | 3/1993 | Netherlands . |
| 2 250 626 | 6/1992 | United Kingdom ............ G11B 23/38 |

OTHER PUBLICATIONS

Japanese Abstract No. 1–288489 to Akihiko Hashimoto Entitled "Optical Card and Card Reader".

Japanese Abstract No. 62–279538 to Keiichi Kameda Entitled "Production of Optical Disk".

Japanese Abstract No. 2–9033 to Toshimitsu Tanaka Entitled "Optical Information Recording Medium".

INFORMATION STORAGE MEDIUM AND ELECTRONIC DEVICE USING THE SAME FOR AUTHENTICATION PURPOSES

TECHNICAL FIELD

The present invention relates to an information storage medium which stores information of game programs, etc., and an electronic device for reading and utilizing the information stored in the information storage medium and more specifically to a CD-ROM and a game machine for optically reading program information stored in the CD-ROM and for executing games.

BACKGROUND ART

Various amusing computer game software have been developed for home video game machines with which various games can be played by changing CD-ROMs. Such video games are very popular for amusement. Sometimes, the supply of popular game software does not catch up with the demand, and CD-ROMs carrying game software are traded at high prices. Counterfeits of such CD-ROMs are continually being discovered.

Producers of game software have made various security systems to prohibit counterfeiting of game software which is the fruit of development by producers with considerable amounts of investment of money, time and effort.

In one such security system, the agreement of data, such as a special code incorporated into program information read from a CD-ROM with data stored in advance in a main body of a game machine is judged to allow access to the CD-ROM.

However, in such conventional security systems, where security depends on the agreement between program information stored in a storage medium and data stored in a main body of a game machine, security is unavoidably released when security data are decoded. If the security is released, means for expelling counterfeits are limited, which makes it difficult to effectively expel counterfeit from the market.

Known security systems for improving such disadvantages are described in Japanese Patent Laid-Open Publication No. 101349/1983, U.S. Pat. No. 4,454,594, U.S. Pat. No. 4,442,486, U.S. Pat. No. 4,462,076, etc.

In the security system disclosed by the known art, a coded identifier indicative of a trademark, copyright or the like, is stored in a program memory in a video game cartridge, and a reference identifier is stored in a computer system in a video game machine. When the cartridge is loaded into the video game machine, the reference identifier in the video game machine is compared with the identifier read from the program memory.

When the comparison finds agreement between the reference identifier in the video game machine and the identifier in the program memory, the identifier, i.e., a trademark, copyright or the like, is displayed on a monitor display. When they do not agree with each other, the operation of the video game machine is stopped, prohibiting the execution of the program.

For a counterfeiter to supply a program operative on video game machines, it is necessary to incorporate a coded identifier corresponding to a trademark, copyright or the like which agrees with a reference identifier stored in advance in authentic game machines. This is an infringement, in principle, of proprietary rights, such as trademarks, copyrights or the like.

In a conventional security system, unless a counterfeiter displays a trademark, copyright or the like corresponding to a reference identifier visibly on the exterior surface of, e.g., a cartridge, legal accusation is difficult, as property right infringement is based only on visually observed trademarks, copy right or the like. Hence, conventional security systems are at a disadvantage and make it difficult to seek protection under trademark acts, intellectual property laws, etc.

A first object of the present invention is to provide an information storage medium incorporating a novel security system which can effectively expel counterfeits or unauthorized copies and an electronic device using the same.

A second object of the present invention is to provide an information storage medium which can effectively expel counterfeits even when its security system is deciphered, and an electronic device using the same.

A third object of the present invention is to provide an information storage medium which can effectively expel counterfeits, and an electronic device using the same.

A fourth object of the present invention is to provide an information storage medium which can easily detect a specific indication in a security system, and an electronic device using the same.

DISCLOSURE OF INVENTION

The electronic device according to one embodiment of the present invention comprises a medium mounting unit on which an information storage medium storing information is to be mounted, an optical detection unit which optically detects an information region storing said information, and a predetermined region defined at a surface of said information storage medium mounted on said medium mounting unit, a storage unit which stores reference signals corresponding to a specific indication, and a judging unit which compares a detected signal which is generated by detecting said predetermined region of the surface of said information storage medium by said optical detection unit, with said reference signal stored in said storing unit to judge whether or not said specific indication is displayed in said predetermined region of said information storage medium.

According to this embodiment, when a counterfeiter supplies information storage mediums intended to operate on an authentic electronic machine, he has to illegally display a visually recognizable a specific indication corresponding to said reference signal on the surface of the counterfeit information storage medium, whereby counterfeits can be more effectively expelled from the market.

The electronic device according to another embodiment of the present invention comprises a medium mounting unit on which an information storage medium storing a game program is to be mounted, an optical detection unit which optically detects an information region storing said program and a predetermined region defined at a surface of said information storage medium mounted on said medium mounting unit, a game control unit which controls a game in accordance with said game program stored in said information storage medium, a storage unit which stores a reference signal corresponding to a specific indication, and a judging unit which compares a detected signal which is generated by detecting said predetermined region, with said reference signal stored in said storing unit to judge whether or not said specific indication is displayed in said predetermined region.

According to this embodiment, when a counterfeiter supplies disc storage mediums intended to operate on an authentic game machine, he has to illegally display a visually recognizably a specific indication corresponding to said reference signal on the surface of the counterfeit discs, whereby counterfeits of game machines and game software can be effectively expelled from the market.

The electronic device according to still another embodiment of the present invention further comprises an operation control unit which controls an operational state of said electronic device in accordance with a judgement result of said judging unit. The operation control unit may stop operation of said electronic device when said judging unit judges that said specific indication is not displayed in said predetermined region at said surface of the information storage medium. The electronic device may further comprises an operation control unit which stops proceeding of said game program when said judging unit judges that said specific indication is not displayed in said predetermined region at said surface of the information storage medium. The electronic device may further comprises a warning display unit which displays a predetermined warning on a monitor when said judging means judges that said specific indication is not displayed in said predetermined region at said surface of the information storage medium. The electronic device may further comprises a specific display unit which displays a predetermined display on a monitor when said judging means judges that said specific indication is displayed in said predetermined region at said surface of the information storage medium.

According to this embodiment, in a case of an information storage medium storing software, such as a game program or others, that has no specific visible indication in a predetermined region, the operation of the electronic device is stopped, a warning to the effect that the information storage medium is a counterfeit is displayed, or a specific indication is displayed only when an authentic one is used, whereby using of counterfeits can be effectively hindered.

The electronic device according to still another embodiment of the present invention is characterized in that said predetermined region is disposed at a surface of said information storage medium opposite to an optical detection surface thereof through which said information region is to be optically detected, and said optical detection unit may include information detecting means which detects said information region through said optical detection surface of the information storage medium, and display detecting means which detects said predetermined region through said surface opposite to said optical detection surface of the information storage medium.

According to this embodiment, the indication detection unit is disposed as an independent mechanism from the information detection unit, so that detection can be facilitated.

The electronic device according to still another embodiment of the present invention is characterized in that said predetermined region is disposed so as to be detected through said optical detection surface of the information storage medium, through which said information detection region is optically detected, and said optical detection unit may detect said information region and said predetermined region through said optical detection surface of the information storage medium.

According to this embodiment, without an indication detection unit separate from the information detection unit, the security detection can be effectively conducted.

The electronic device according to still another embodiment of the present invention is characterized in that said information region of the information storage medium has said information written by using pits as digital information in said information region of the information storage medium, and said specific indication is visually recognizably by using a group of pits in said predetermined region of the information storage medium. The information storage medium may be a CD-ROM.

The electronic device according to still another embodiment of the present invention is characterized in that said specific indication is of a nature that an unauthorized use of said specific indication on said information storage medium is legally prohibited. Said specific indication may be a registered trademark.

According to this embodiment, security can be incorporated easily in an information storage medium. Furthermore, even if the security system should be decoded, a counterfeit disc would have to bear a specific indication in order to be used on the authentic electronic device. Suppliers of authentic software, such as a game program or others, can effectively expel counterfeits from the market, based on legal rights, such as intellectual property rights or others, based on the specific indication.

The information storage medium according to one embodiment of the present invention comprises an information region in which information is stored in an optically detectable manner, said medium further comprising a predetermined region in which a specific indication is visually recognizably displayed, said specific indication being detected by an optical detection unit to be compared with a reference signal stored in advance in said electronic device when said medium is mounted on the electronic device.

The information storage medium according to another embodiment of the present invention comprises an information region in which a game program is stored in an optically detectable manner, said medium further comprising a predetermined region in which a specific indication is visually recognizably displayed, said specific indication being detected by an optical detection unit to be compared with a reference signal stored in said electronic device when said medium is mounted on the electronic device.

According to this embodiment, in order to use a counterfeit on the electronic device, it would be necessary to visibly display a specific indication on a counterfeit information storage medium. Suppliers of authentic software, such as a game program or others, can effectively expel counterfeits from the market, based on a right, such as an intellectual property right or others, entitled to the specific indication.

The information storage medium according to still another embodiment of the present invention is characterized in that said predetermined region is disposed at a surface of said information storage medium opposite to an optical detection surface thereof through which said information region is optically detected.

According to this embodiment, the electronic device on which an information storage mediums are to be mounted can include the indication detecting unit detecting a specific indication as a mechanism independent from the information detecting unit, so that the detection can be facilitated.

The information storage medium according to still another embodiment of the present invention is characterized in that said predetermined region is disposed so as to be detected through said optical detection surface of the information storage medium, through which said information detection region is optically detected.

According to this embodiment, the electronic device into which information storage medium is to be mounted can effectively conduct security detection without an additional indication detection unit separate from the information detection unit.

The information storage medium according to still another embodiment of the present invention is characterized in that said information is written by using pits as digital information in said information region, and said specific indication may be visually recognizably written by using a group of pits in said predetermined region. The information storage medium may be a CD-ROM.

The information storage medium according to still another embodiment of the present invention is characterized in that said information storage medium may be disc-shaped. The predetermined region may be disposed at an inner circumference or at an outer circumference of said information region.

According to this embodiment, security can be easily incorporated in an information storage medium, and reading errors due to contamination on the predetermined region can be reduced.

The information storage medium according to still another embodiment of the present invention is characterized in that said specific indication is of a nature that an unauthorized use of said specific indication on said information storage medium is legally prohibited. Said specific indication may be a registered trademark.

According to this embodiment, even if the security system is decoded, in order to use a counterfeit disc on the authentic electronic device, the counterfeit disc has to use a specific indication. Accordingly a supplier of authentic software, such as a game program or others, can effectively expel counterfeits, based on a right, such as an intellectual property right or others, entitled to the specific indication.

The information storage medium according to still another embodiment of the present invention comprises a transparent disc-shaped substrate, an information storing region defined at a surface of said substrate with game program information stored with pits, an image indication region defined at a region of said surface of the substrate different from said information storage region, a predetermined region disposed in said image indication region with an image indication formed visually recognizably by using a group of pits and of a nature that an unauthorized use of said image indication on said information storage medium is legally prohibited, a reflection layer covering said surface of the substrate, and a protection layer covering said reflection layer.

According to this embodiment, a counterfeiter has to form a visibly recognizable said image indication as indication information born by an authentic information storage medium on his counterfeits, so that counterfeits can be effectively expelled.

The information storage medium according to still another embodiment of the present invention comprises a transparent disc-shaped substrate, a first zone defined in a ring-shape at a surface of said substrate and formed with digital information recorded with pits, a second zone defined at said surface of the substrate in a ring-shape concentric with said first zone, a predetermined region disposed in said second zone with a visibly recognizable image indication formed by using a group of pits and of a nature that an unauthorized use of said image indication on said information storage medium is legally prohibited, a reflection layer covering said surface of the substrate, and a protection layer covering said reflection layer. The second zone may be at an inner or an outer circumference of said first zone.

According to this embodiment, the image indication can be easily distinguished from the digital information by changing reading control according to each of the concentric zones.

The information storage medium according to another embodiment of the present invention is characterized in that said predetermined region is formed in a plural number in said second zone.

According to this embodiment, any one of the plural image indications can be read even though there may be difficulty in reading some image indications because of contamination. Accordingly reading of the predetermined regions never becomes impossible.

The information storage medium according to still another embodiment of the present invention comprises a transparent plastic disc, a first region disposed at a surface of said transparent plastic disc with game program information recorded with pits, a second region disposed at a position of said surface of the transparent plastic disc different from said first region with a trademark formed visually recognizably by using a group of pits, a reflection layer covering the transparent plastic disc, and a protection layer covering said reflection layer.

BEST MODE FOR CARRYING OUT THE INVENTION

The game machine according to a first embodiment of the present invention will be explained with reference to FIGS. 1 to 5.

Figure 1:
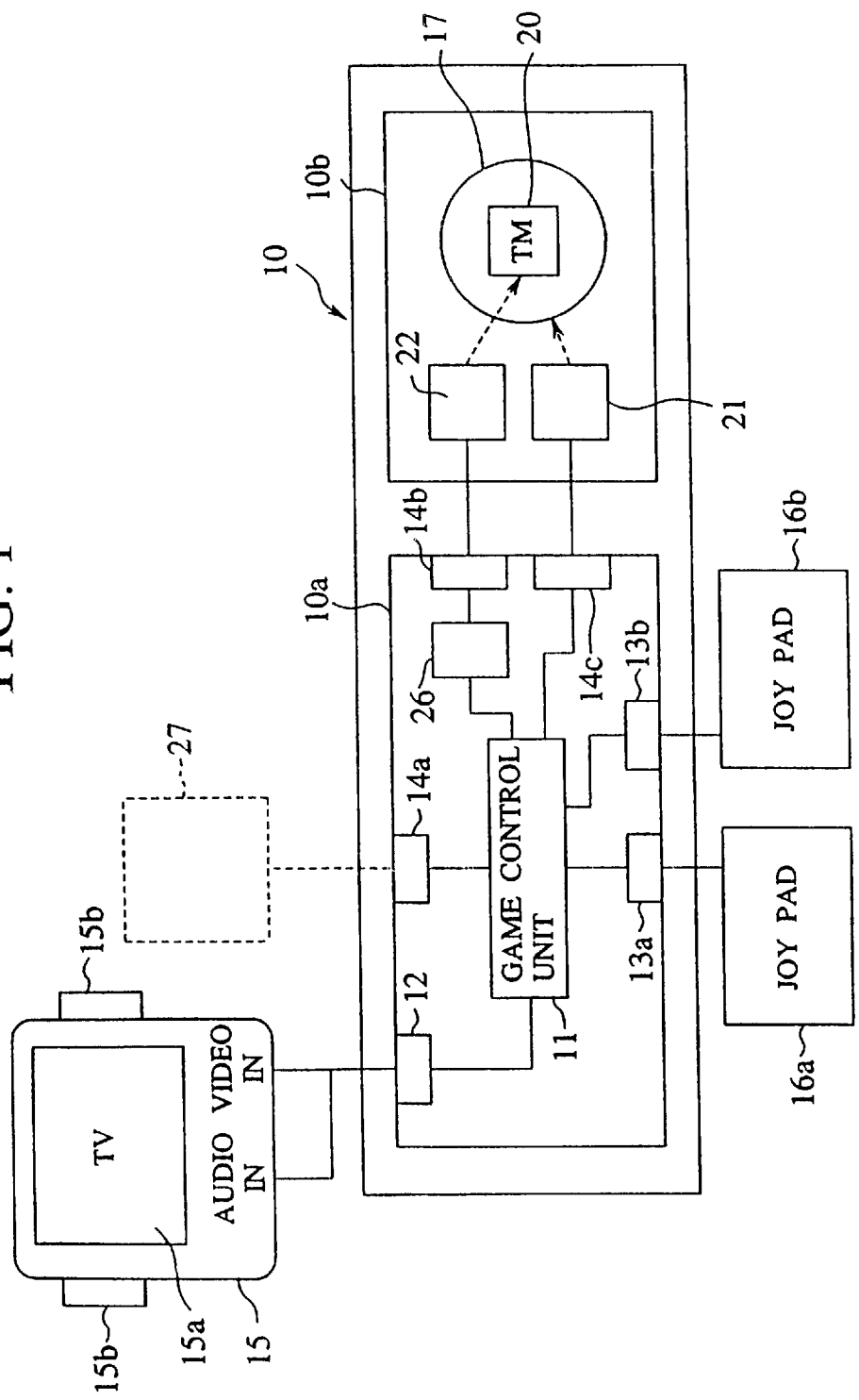
FIG. 1 is a block diagram of the game machine according to a first embodiment of the present invention.
Figure 2:
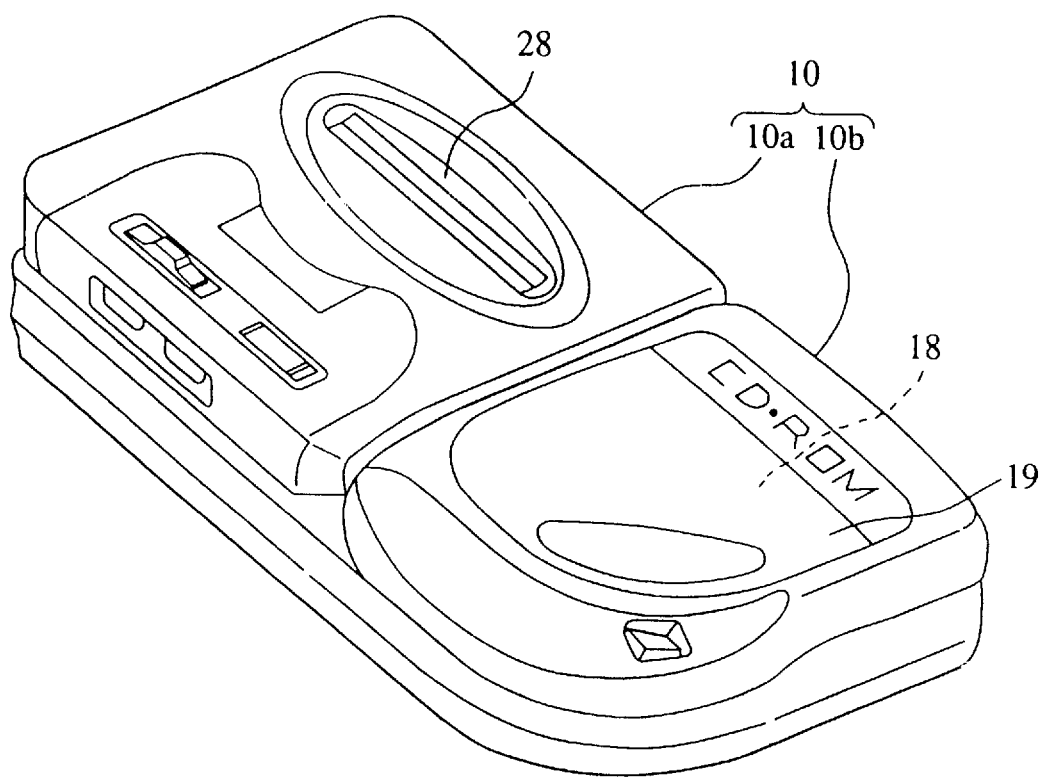
FIG. 2 is a perspective view of the main body of the game machine.

As shown in FIGS. 1 and 2, the main body 10 of the game machine includes a control unit 10a and a CD-ROM control unit 10b. The control unit 10a is provided with a game control unit 11 for controlling games, an output interface 12 for supplying audio and video signals, input interfaces 13a, 13b for receiving operation or manipulation signals, and input/output interfaces 14a, 14b, 14c for receiving/supplying the program and data for executing games. The output interface 12, the input interfaces 13a, 13b, and the input/output interfaces 14a, 14b, 14c are all connected to the game control unit 11.

As shown in FIG. 1, the control unit 10a is connected to a television unit 15 employed as a display unit for displaying the contents of a game via output interface 12. The control unit 10a is also connected to various controllers, e.g., joy pads 16a, 16b for manipulating play of the game, via input interfaces 13a, 13b. The main body 10, the television unit 15, the joy pads 16a, 16b, etc., constitute the game machine.

As shown in FIG. 2, a CD-ROM mount 18 for a CD-ROM 17, an optical information storage medium, to be removably mounted on is formed on the top surface of the CD-ROM control unit 10b. The CD-ROM mount 18 is covered by a lid 19 which can be opened and closed. After the CD-ROM 17 has been put on the CD-ROM mount 18, the mount 18 is closed by the lid 19 to cover the CD-ROM 17.

Figure 3:
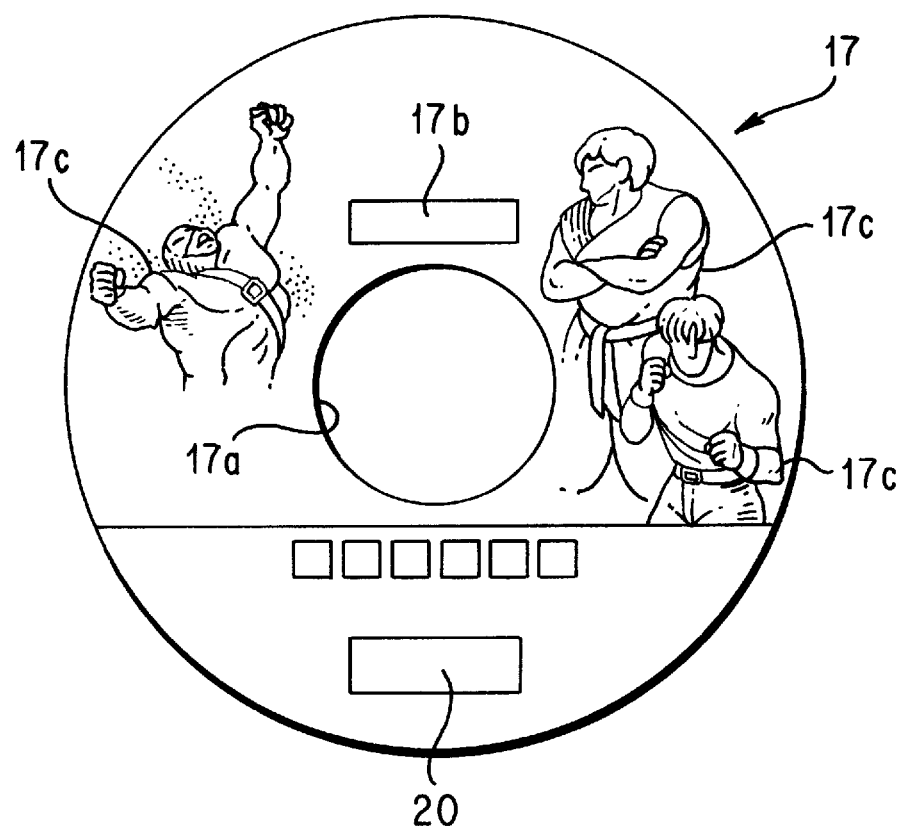
FIG. 3 is a plan view showing the CD-ROM in FIG. 1.

As shown in FIG. 3, the CD-ROM 17 is a thin disc with a center hole 17a in the center thereof. In the present embodiment, the CD-ROM 17 stores digital information, e.g. that of a game program, data, etc., with pits.

On the upper surface of the CD-ROM opposite to the underside thereof, the optical detection surface, through which the pits in the CD-ROM 17 are detected by laser beams, a title of the game 17b, a design of the game 17c, a trademark TM indicative of a manufacturer of the game, etc. are indicated. The trademark TM, etc. are indicated in a trademark indication region 20 near the outermost periphery. In this specification, the trademark indication region 20 may be called "a predetermined portion" or "a predetermined region".

In the CD-ROM mount 18, an optical pickup 21, which is an information detecting means, is located so as to face to the underside of the mounted CD-ROM 17, which is the optical detection surface. The optical pickup 21 is disposed radially movably over the underside of the disc 17. The optical pickup 21 reads program information from the CD-ROM 17 as it is rotated by a drive motor. The optical pickup 21 is connected to the input/output interface 14c of the main body 10. The program information read by the optical pickup 21 is supplied to the game control unit 11 via the input/output interface 14c.

When the CD-ROM 17 is thus placed on the mount, the game machine operates and images are displayed on a screen 15a of the television unit 15 while the joy pads 16a, 16b are operated to play the game. The CD-ROM 17 is replaced by a different CD-ROM storing different program information to play a different game.

The main body 10 can reproduce music, information, etc. from data stored on various CDs. Music can be listened to from speakers 15b of the television unit 15, and literal information can be viewed on the television screen 15a.

Figure 4A:
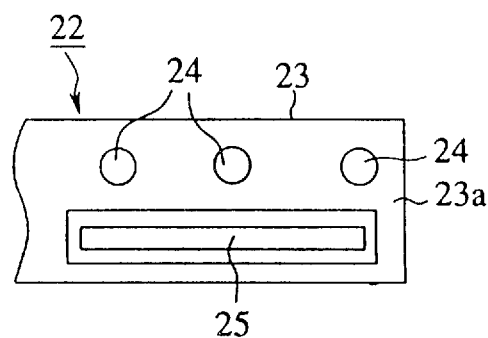
FIGS. 4A and 4B are explanatory views of the recognition sensor in FIG. 1.
Figure 4B:
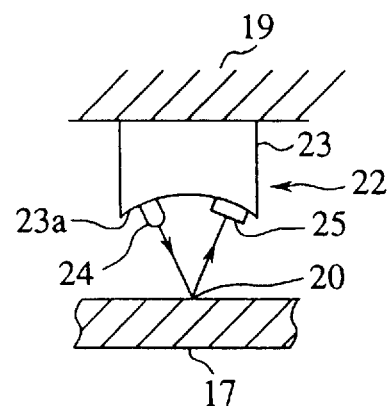

On the backside of the lid 19, a recognition sensor 22 is provided for reading the trademark indication region 20 of the CD-ROM 17 mounted on the CD-ROM mount 18. When the lid 19 is closed after the mounting of the CD-ROM, the recognition sensor 22 is situated opposite o the trademark indication region 20, As shown in FIGS. 4A and 4B, the recognition sensor 22 has a base 23 which extends radially over the exterior surface of the CD-ROM 17, covering the length of the trademark indication region 20. As shown in FIG. 4A, the surface 23a of the base 23 has a plurality of light emitting portions 24 disposed in the radial direction of the top surface of the CD-ROM 17, and a light detecting portion 25 disposed linearly also in the radial direction. One or a plurality of the light emitting portions 24 are disposed as required.

The light emitting regions 24 and the light detecting region 25 are so arranged that light emitted from the light emitting portion 24 is reflected by the trademark indication region 20 to be incident on the light detecting unit 25. As seen in FIG. 4B, the light emitting regions 24 and the light detecting region 25 are disposed tilted with respect to each other on both ends of the concave surface 23a. Accordingly, a path drawn by tracing out along the trademark indication region 20 of the CD-ROM 17 upon rotation is always within the range of recognition of the recognition sensor 22.

Thus, when the CD-ROM 17 is placed on the CD-ROM mount 18, and the mount 18 is closed by the lid 19, the recognition sensor 22 can read a trademark TM on the trademark indication region 20. The read-out signal of the trademark TM is supplied to a judgement unit 26 in the control unit 10a through the input/output interface 14b.

The recognition sensor 22 may instead be disposed on an extension (not shown) of the main body 10 over the CD-ROM mount 18 so as again to be opposed to the CD-ROM 17. The CD-ROM 17 is inserted below the extension so as not to touch the extension. The extension is located at a position where it will not interfere with mounting and dismounting the CD-ROM 17, and in a position where the recognition sensor 22 can recognize the trademark indication region 20.

The recognition sensor 22 may be located on the forward end of a retractable arm (not shown) which is positioned in the main body 10 and is extendible to the CD-ROM mount 18. This arm automatically extends over the CD-ROM 17 into a position where the trademark indication region 20 can be recognized when the CD-ROM 17 is mounted. Thus, this arm does not hinder mounting and dismounting the CD-ROM 17.

The judgement unit 26 compares a signal corresponding to the trademark TM detected by the recognition sensor 22 with trademark information stored beforehand as a reference in the main body 10, and outputs an agreement or disagreement signal.

The information stored beforehand as the reference in the judgement unit 26 is not limited to a trademark and may be a specific indication that can be legally protected, i.e., a design, a tradename or the like, such as a game character. It is preferable that when an unauthorized person attempts to use the specific indication, use is prohibited by the specific indication. The specific indication by the manufacturer of the game machine itself may be owned or licensed from another entity and may be a combination of a plural number of the same indication or of different indications.

The agreement or disagreement signal from the judgement unit 26 is supplied to the game control unit 11. When an agreement signal exists and is inputted to the game control unit 11, security is released, and the program of the CD-ROM 17 is supplied to the game control unit 11. On the other hand, when a disagreement signal exists and is inputted to the game control unit 11, security is not released, and supply of the program information of the CD-ROM 17 to the game control unit 11 is blocked.

When the game control unit 11 receives a disagreement signal, it executes an error processing routine which, for example, outputs a warning signal to display a warning, such as "This disc cannot be used", on the screen of the television unit 15, or a stop signal for stopping the operation of the main body 10.

Based on such error processing, operators of the game machine know that the CD-ROM 17 with an unauthorized specific indication can not be used.

As shown in FIG. 1, in addition to CD-ROMs 17, game cartridges of semiconductor ROMs and RAMS storing game programs can be used as the information storing media for the main body 10. In such case, as shown in FIG. 2, a cartridge 27 is inserted into the cartridge mount 28 of the control unit 10a, thereby supplying game program information to the game control unit 11 through the input/output interface 14a.

Figure 5:
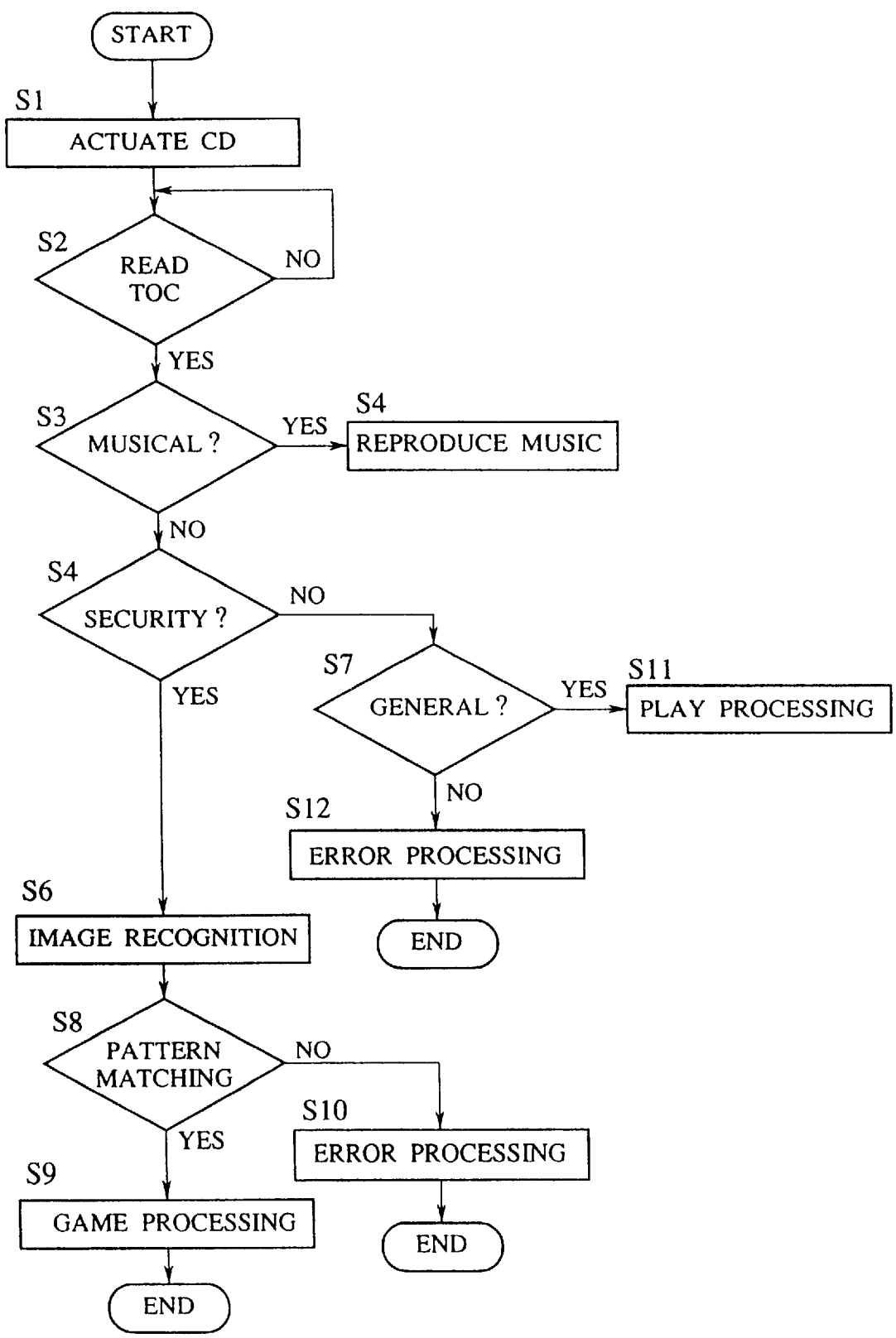
FIG. 5 is a flow chart of the operation of the game machine of FIG. 1.

The operation of the game machine according to the present embodiment will be explained with reference to the flow chart of FIG. 5.

First, a disc, such as a CD-ROM 17 storing a game program is placed on the CD-ROM mount 18, and the lid 19 is closed. The disc is thus mounted on the main body 10. The main body 10 can reproduce music or other information from data stored in the CD, e.g. musical CDs, data information CDs mounted thereon.

The optical pickup 21, and the recognition sensor 22 are then ready for actuation. The disc drive is actuated, and the mounted disc is rotated (Step S1).

When the disc starts rotation, the optical pickup 21 picks up TOC (Table of Contents) information from the innermost circumference of the disc (Step S2). If the optical pickup 21 fails to read this information, Step S2 is repeated.

The TOC is read to judge whether or not the mounted disc is a musical CD (Step S3). If the disc is a musical CD, Step S4 follows to reproduce the music. When the disc is other than a musical CD, Step S5 follows to judge whether or not security has to be checked in reproducing the disc, i.e., whether or not the disc holds a game software information requiring judgement as to whether it is authentic or counterfeit.

When a security check is required, Step S6 follows, and the recognition sensor 22 reads the trademark indication region 20 which should indicate a specific trademark on the CD-ROM 17. When security check is not required, Step S8 follows to judge whether the disc is a general purpose disc.

Information read by the recognition sensor 22 is supplied to the judgement unit 26, and the judgement unit 26 conducts pattern matching in which the read information is compared with specific trademark information stored beforehand as a reference to judge whether the read information agrees with the specific trademark information (Step S8).

When the specific trademark is recognized, i.e., when the judgement unit 26 judges that the read information agrees with the reference information, Step S9 follows. Security is released and program information in the CD-ROM 17 is transmitted to the game control unit 11 for game processing there.

When the specific trademark is not displayed in the predetermined region of the disc, Step S10 follows. Security is not released, and error processing, such as a warning display or the like, is conducted.

In Step S7, when the information stored in the disc is general software other than game software, Step S11 follows to conduct play processing. For example, when the disc is a data information CD, read data is displayed on the monitor. When the information is not general software, i.e., the disc holds data in a format that is incompatible with the main body 10, error processing, such as a warning display or the like, is conducted (Step S12).

Thus, whereas the conventional security system employs a process of judging agreement with a specific code or the like, the game machine according to the present embodiment requires, the agreement of a visual indication, such as a trademark or the like, with a reference indication for security. As the visual indication an image such as a trademark which is widely recognized with its originality can be used and indicated necessarily on CD-ROMs. Such image can effectively hinder counterfeiting, thereby enhancing security, In the case where musical and data information CDs require security, the present invention as applicable to those as it is game software CD-ROMs, and can also effectively expel counterfeits.

The game machine according to a second embodiment of the represent invention will be explained with reference to FIGS. 6 to 9. Elements common to the first embodiment and the second embodiment are indicated by common numerals so as to avoid repetition.

A game machine 29 according to the second embodiment reads a trademark indication region 30 formed at an information storage area via an optical detection surface by an optical pickup 21. The trademark indication region is formed not on the upper surface of a CD-ROM 17, an exemplary information storage medium, but rather in the storage area of the CD-ROM 17. Trademark information in the predetermined region can be read without additionally providing the recognition sensor 22 as in the game machine according to the first embodiment.

Figure 6:
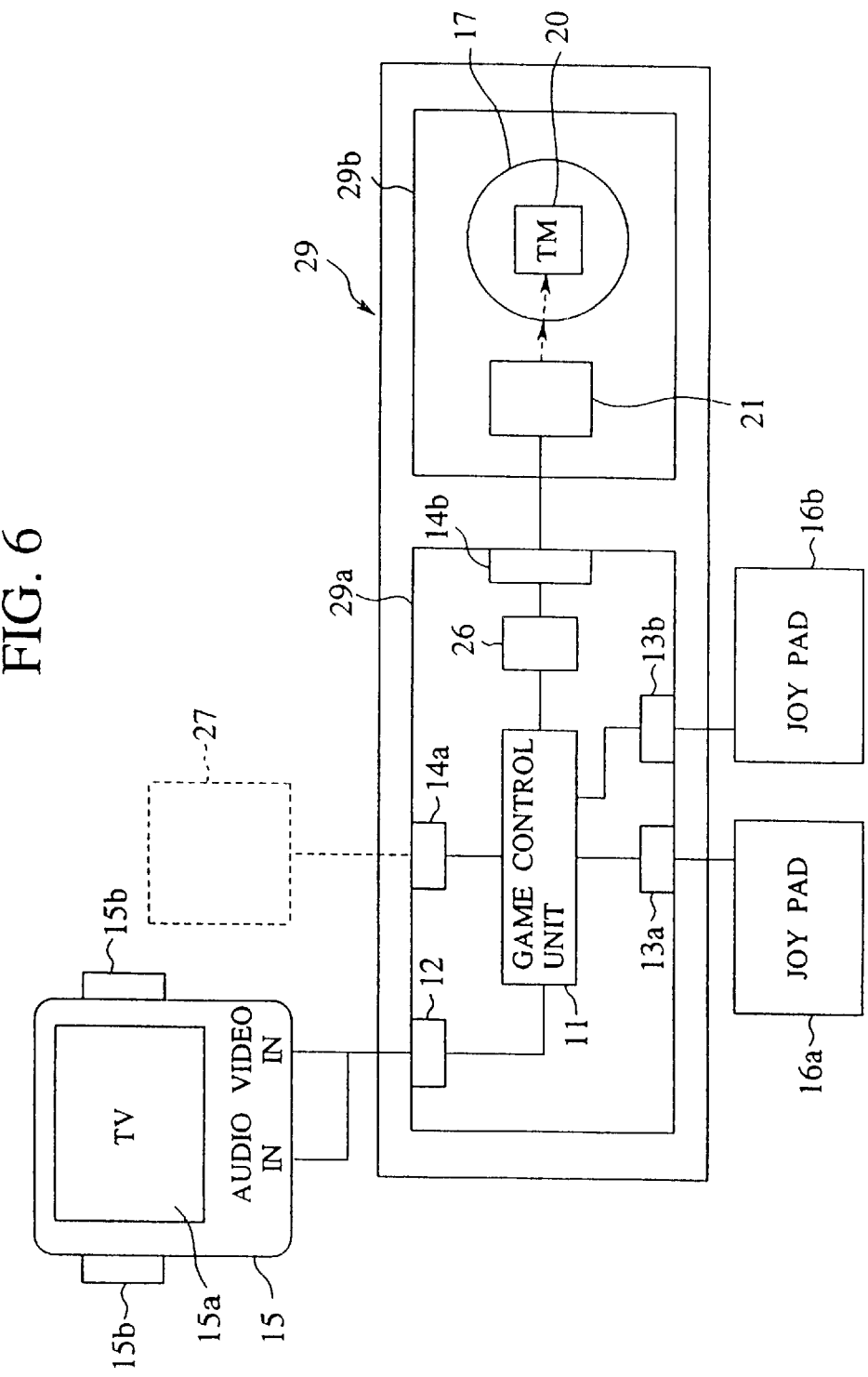
FIG. 6 is a block diagram of the game machine according to a second embodiment of the present invention.

As shown in FIG. 6, the game machine 29 comprises a control unit 29a, and a CD-ROM control unit 29b which obtains trademark information via an optical pickup 21 in place of the recognition sensor 22. In the control unit 29a an input/output interface 14b connected to the optical pickup 21 is connected to a game control unit 11 through a judgement unit 26. The rest of the game machine 29 has the same construction as the game machine according to the first embodiment.

The optical pickup 21 reads program information stored in the CD-ROM 17 and also reads a specific indication stored in the trademark indication region 30. That is, the optical pickup 21 functions as an information detecting means which detects an information region of the CD-ROM 17, and a predetermined region of the CD-ROM 17.

Figure 7:
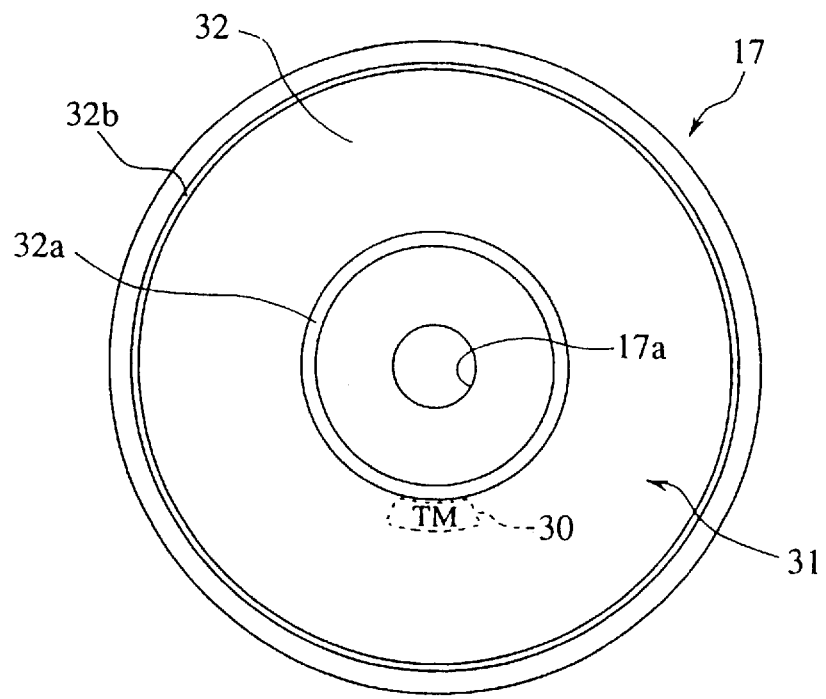
FIG. 7 is a plan view of the CD-ROM in FIG. 6.

In the present embodiment, as show in FIG. 7, the trademark indication region 30 is formed visibly through a transparent plastic substrate 31 of the CD-ROM 17, or the optical detection surface thereof.

As shown in FIG. 7, a program region 32 in which program information for a game is stored with pits is formed on the plastic substrate 31 between a read-in region 32a and a read-out region 32b. In the program region 32, the trademark indication region 30, in which the game program information is not stored, is formed over about 100–200 tracks adjacent to the read-in region 32a.

In the trademark indication region 30, a trademark TM is formed visually recognizably by using a group of pits. When the optical pickup 21 reads the trademark indication region 30, the location of which is indicated by TOC information, the trademark TM is detected as security check information, and its shape can be visually recognized from the optical detection surface.

Figure 8:
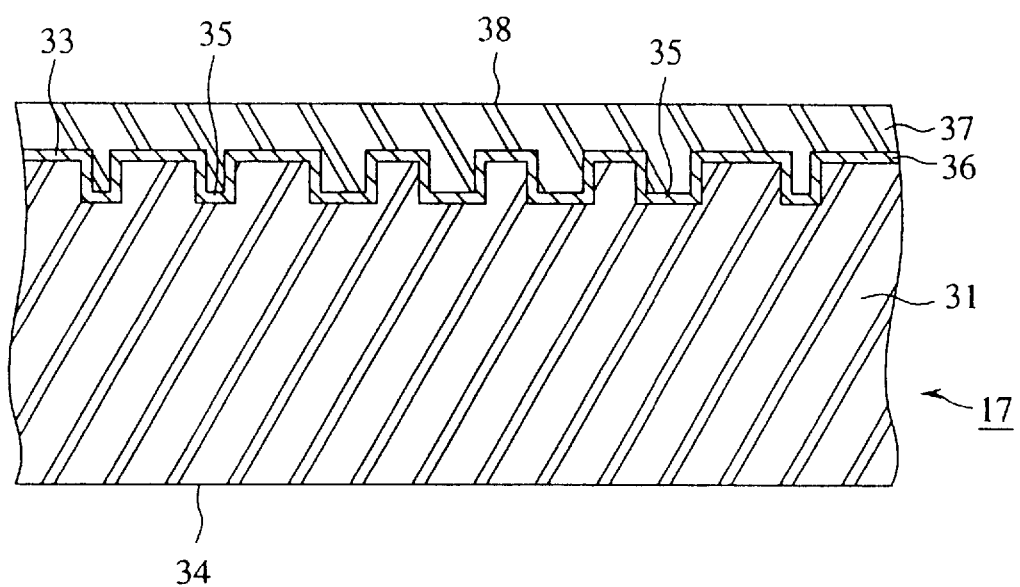
FIG. 8 is a partial sectional view of a major part of the CD-ROM of FIG. 6.

A shown in FIG. 8, on the upper surface 33 of a plastic substrate 31, the CD-ROM 17 stores game program information by using a group of pits, and has the trademark indication region 30 formed thereon. The substrate can be of polycarbonate, acryl, polyvinylchloride or others. The top surface 33 with the pits formed therein is covered with a reflection layer 36 of metal, such as aluminium and further with a protection layer 37, whereby an exterior surface 38 is formed. Usually the protection layer 37 is formed of a transparent material, and a title 17b of a game software program, a design 17c relating to the game, a trademark 20, etc. can be indicated on the exterior surface 38, as seen in FIG. 3.

In this embodiment, information stored in the CD-ROM 17 is detected by a laser beam directed to the underside surface 34 of the transparent plastic substrate 31. The beam is reflected by the reflection layer 36 and detected by the optical pickup 21. The trademark 30 is formed by using a group of pits on the optical detection surface 34 which is the undersurface of the CD-ROM 17, so that its shape can be visually recognized through plastic substrate 31 from underside surface 34.

The optical pickup 21 is connected to the input/output interface 14b, and the input/output interface 14b is connected to the game control unit 11 through the judgement unit 26.

The optical pickup 21 is radially moved with respect to the CD-ROM 17 on rotation from the read-in region 32a to the read-out region 32b to read program information and trademark information from the CD-ROM 17.

Digital-coded information is stored in a predetermined format in the program region 32 of the CD-ROM 17, and an image indication is visibly formed with pits in the predetermined region 30 of the CD-ROM 17. Accordingly it is necessary to program the CD-ROM control unit 29 beforehand that the predetermined region 30 stores information in a different format. The reading of trademark information from the predetermined region 30 is carried out on the middle way of reading program information. When detection of the trademark information is started, detection and pick-up of the program information has already begun, and the game is on-going.

As the optical pickup 21 moves from the read-in region 32a to the read-out region 32b, the trademark information is read sequentially, and the read trademark information is supplied to the game control unit 11 through the judgement unit 26.

The judgement unit 26 stores the read trademark information picked up by the optical pickup 21, and when the reading of the trademark information is completed, it compares the stored trademark information with a reference trademark which has been stored beforehand in the judgement unit 26 to judge whether or not they agree with each other and it outputs an agreement or disagreement signal.

Information as a reference which is stored beforehand in the judgement unit 26 is not limited to a trademark, and may be a specific indication, such as a design, e.g., a game character, etc., a tradename, or others which can be legally protected. It is preferable to use such specific indication as is legally prohibited for an unauthorized person to use. The specific indication may be owned by the manufacturer of the game machine itself or licensed from another entity, and may be a combination of a plural number of the same indication or of different indications.

The signal from the judgement unit 26 is supplied to the game control unit 11. When the signal is an agreement signal, security protection is released, and the program information is supplied to the game control unit, and the game continues. When the signal is a disagreement signal, security protection is not released, and transfer of the program information is stopped.

When the game control unit 11 receives a disagreement signal, it conducts error processing by, e.g, outputting a warning signal such as "This disc cannot be used." onto the screen of a television unit 15, or outputting a stop signal for stopping the operation of the game machine 10.

Figure 9:
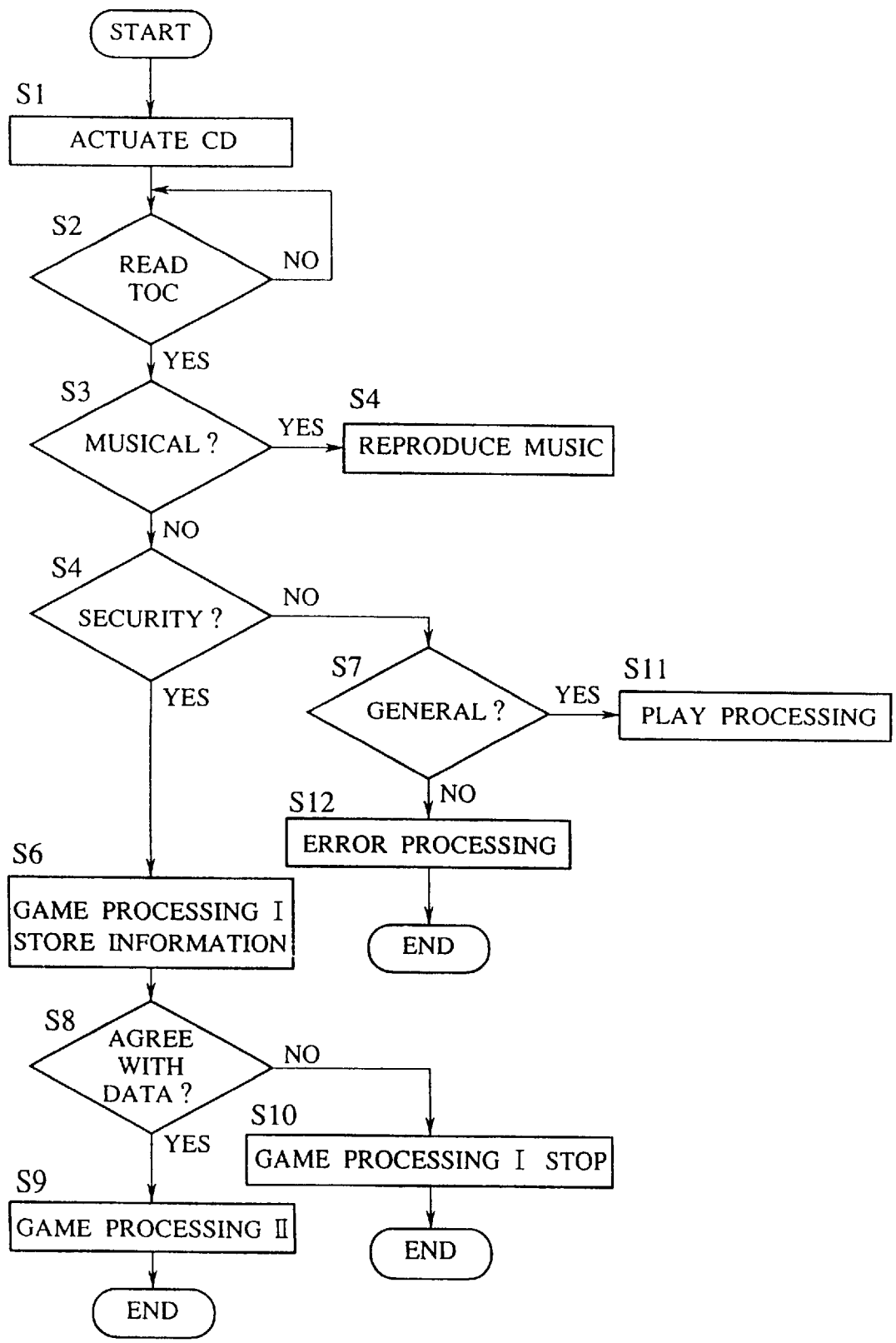
FIG. 9 is a flow chart showing the operation of the game machine of FIG. 6.

The operation of the game machine according to the second embodiment will be explained with reference to the flow chart of FIG. 9.

First, a disc 17, such as a CD-ROM or other, which stores game software is inserted into the CD-ROM mount unit 18 and then a lid 19 is closed. The disc 17 is now made mounted on the game machine 10. The game machine 10 can also reproduce music, information etc., from various CDs.

A disk drive is actuated to rotate the disc, and the optical pickup 21 starts to read information (Step S1).

Following the actuation of the disc, the optical pickup 21 reads TOC information in the innermost circumference of the disc. If the optical pickup 21 fails to read TOC information, it tries again (Step S2).

TOC information is used to judge whether or not the mounted disc is a musical disc (Step S3). If the disc is a musical disc, Step S4 follows to reproduce the music. If the disc is other than a musical disc, Step S5 follows to judge whether or not a security check is necessary, i.e., whether the disc is a software disc which requires judgement as to whether the disc is authentic or counterfeit.

If the security check is necessary, Step S6 follows. The optical pickup 21 advances to the program region 32 to read program information and the predetermined region 30 in which a specific trademark is indicated. The trademark information read from the predetermined region 30 is supplied to the judgement unit 26 and stored there. Trademark information as well as program information is concurrently read. Game processing I is conducted, and the game is started.

When security checking is not necessary, Step S7 follows to judge whether or not the information stored in the disc is general software.

When the reading of the trademark information is completed, data signals corresponding to the trademark information which have been supplied to and stored in the judgement unit 26 are compared with data signals corresponding to the previously stored specific trademark information in the judgement unit 26 (Step S8).

When the information read from the predetermined region 30 on the disc is judged to agree with the specific trademark information previously stored in advance in the judgement unit 26, security is released, and the program information is transmitted to the game control unit 11, and the game processing I is followed by game processing II (Step S9). When the information read from the predetermined region 30 is judged to disagree with the specific trademark information, security is not released, and the execution of game processing I is stopped. Error processing, such as display of a warning, or other, follows (Step S10).

On the other hand, in Step S7, when the information stored in the disc is judged to be general software other than game software, Step S11 follows, and PLAY processing is conducted. For example, when the disc is a data information CD, data are displayed on the screen.

When the disc does not hold general software, i.e., the disc holds software which is incompatible with the game machine 10, error processing, such as displaying a warning, or others, is conducted (Step S12).

Thus, whereas the conventional security system utilizes a process of judging agreement with a specific code or the like for security in the game machine according to the present embodiment, the agreement of a visual indication, such as a trademark or the like, is judged for security. An image such as the trademark which is widely recognized with its originality and indicated necessarily on CD-ROMs can be used as the visual indication. Such image can effectively hinder counterfeiting, thereby enhancing security, If musical and data information CDs require security, the present invention is applicable to them in the same manner as the game software CD-ROMs, and can be used equally as well to expel counterfeits from the market.

The present invention is not limited to the above-described embodiments.

Figure 10A:
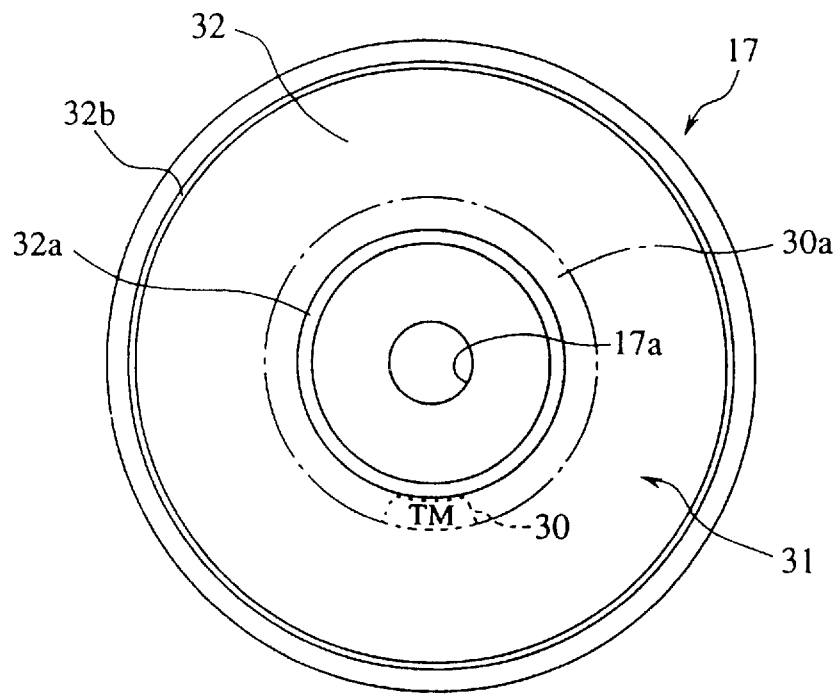
FIGS. 10A to 10D are plan views of variations of the CD-ROM of FIG. 6.

For example, in the above-described second embodiment, as shown in FIG. 10A, it is possible that a zone 30a in which none of game program information is recorded is provided along the inner circumference of a disc, and a predetermined region 30 in which a specific trademark is indicated with using a group of pits is provided in the zone 30a. In the second embodiment, as shown in FIG. 10B, a zone 30b in which none of game program information is stored is provided along the outer circumference of a disc, and a predetermined region 30 in which a specific trademark is indicated by using a group of pits is provided in the zone 30*b*.

Figure 10B:
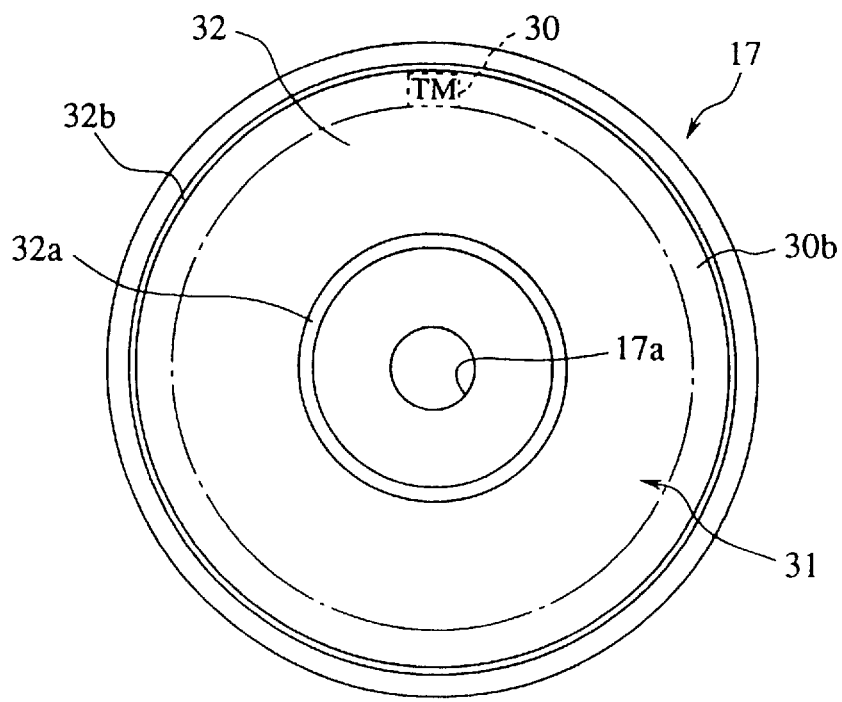

In the variations shown in FIGS. 10A and 10B, the zone 32 in which a game program is stored is separated from the zone 30*a* or the zone 30*b*. The zone 32, and the zone 30*a* or 30*b* which have different information storing modes or formats from each other are spaced apart from each other, thereby control of information reading from the information storage medium can be made simple.

In the above-described variations, it is possible that the periphery of a game disc could be touched by dirty hands, and specific trademark information in the predetermined zone 30 could not be read. To avoid such occurrences, a plurality of predetermined regions are provided spaced from each other in the zone 30*b*, and a specific trademark may be indicated in each of the plural predetermined regions. In reading the specific trademark, when the trademark information in one of the predetermined regions 30 agrees with reference trademark information, security is released. Even if some of the plural predetermined regions 30 are stained by handling so much that the trademark information cannot be read, the rest of the regions 30 can still be read, ensuring higher accuracy.

Figure 10C:
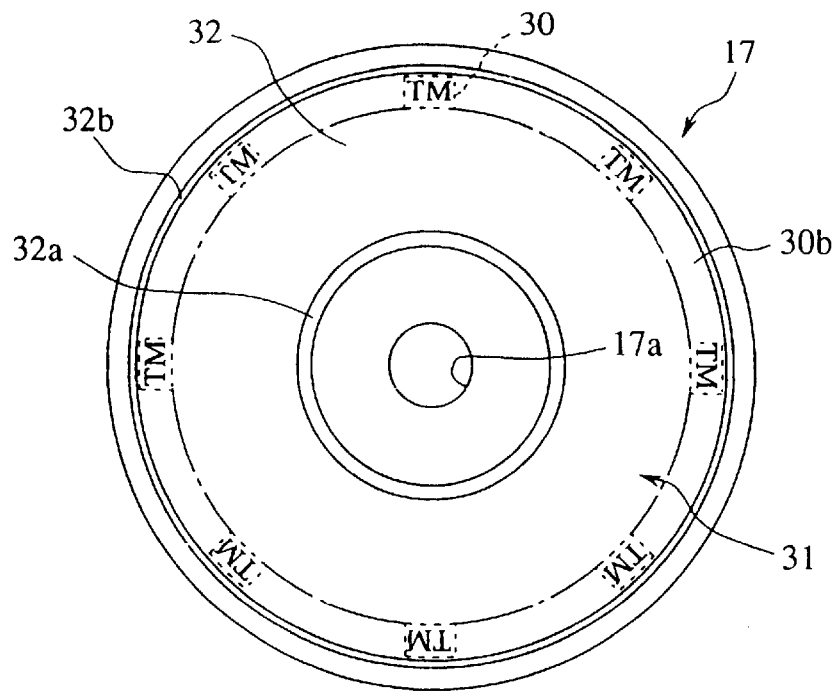

As shown in FIG. 10C, it is possible that a plurality of predetermined regions 30 are provided continuously or at a certain interval in, e.g., the zone 30*b* of the CD-ROM 17, and the same trademark is continuously indicated therein or two different types of specific indications may be indicated alternately. Further a plurality of predetermined regions 30 are formed to fill around the zone 30*b*. Such predetermined regions 30 can be provided in various combinations of numbers, intervals, etc., and a judging reference corresponding o the selected combination is in advance stored in the judgement unit 26, thereby further enhancing security.

Figure 10D:
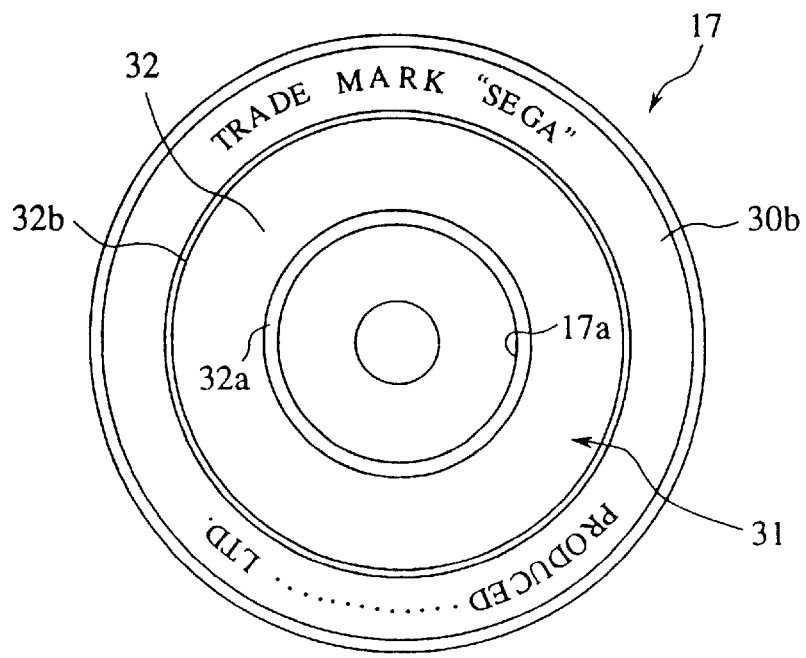

It is possible that the predetermined zone 30*b* in which a specific indication is to be indicated is provided, as shown in FIG. 10D, at an outer circumference of the read-out region 32*b* of the CD-ROM 17. Thus the predetermined zone 30*b* in which a specific indication is indicated can be clearly separated from the zone 30*a* in which program information is stored, whereby control of reading the information and the control of detecting the specific indication can be further facilitated. In the zone 30*b*, as seen in FIG. 10D, the visual image 'TRADE MARK "SEGA"' and 'PRODUCED BY or UNDER LICENSE FROM SEGA ENTERPRISES, LTD' is formed with using a group of pits in the predetermined zone 30*b*.

A specific method of forming a specific indication with pits of the CD-ROM 17 will be explained with reference to FIG. 11.

Figure 11A:
FIGs. 11A to 11C are explanatory views of a specific method for forming a specific indication with pits on a CD-ROM.
Figure 11B:
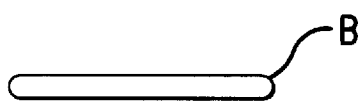
Figure 11C:
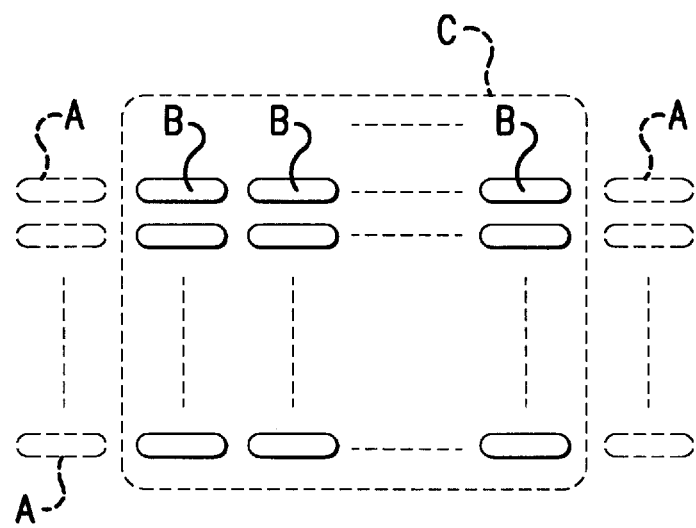
Figure 11D:
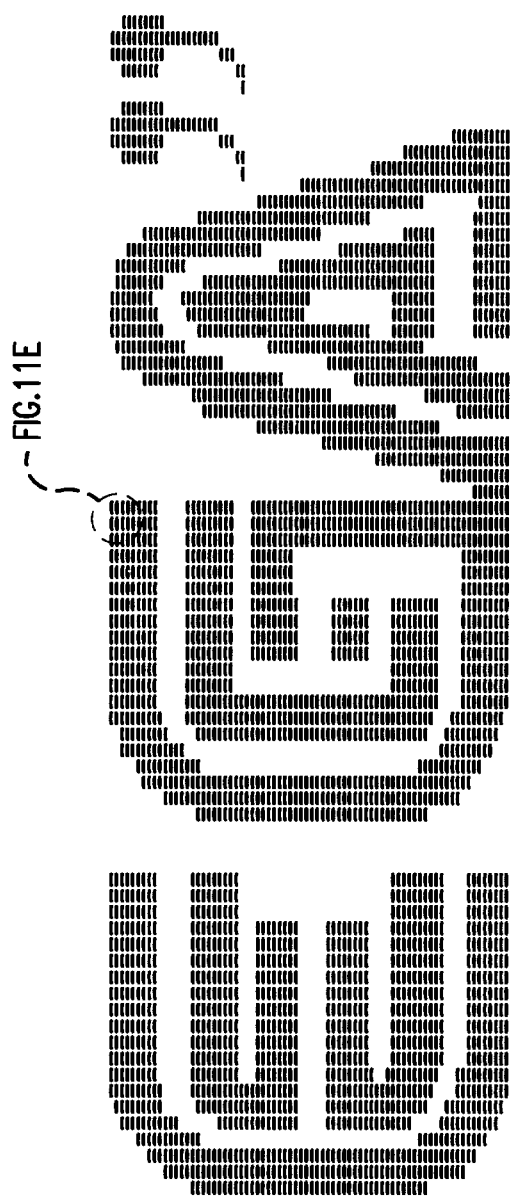
Figure 11E:
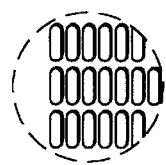

As shown in FIG. 11C, a specific indication, e.g., "SEGA" is formed visibly with using a group of pits on the optical detection surface of the plastic substrate 31. Each dot constituting letters of "SEGA" is formed with using a group of pit arrays B enclosed by the broken line C in FIG. 11B, and the part at which dots constituting letters are not formed is formed with using a group of pit arrays A. The region enclosed by the broken line C can be visible by dots forming the letters with, e.g., 70 vertical tracks and 12 horizontal pit arrays. The group of pit arrays A are formed, as shown in FIG. 11A, with a unit which occupies a minimum pit area of the surface, and, the group of pit arrays B are formed with a unit which occupies a maximum pit area of the surface.

In FIGS. 11A to 11C, a specific indication in the predetermined region 30 of the plastic substrate 31 is formed so as to be recognized as letters when seen from the optical detection surface, but may be formed so as to be recognized as letters when seen from the surface opposite to the optical detection surface.

A specific indication to be used in the security check can be any indication, such as, in addition to a trademark, a graphic design of game characters or others, a tradename, an indication mark of a company or others, which can be identified to effectively expel counterfeit from the market. Namely, it is preferred that a specific indication is an indication by which a legal action can be taken against a person who indicates the indication without authorization. A specific indication can be one which is made by its owner or an indication licensed under a license agreement. The same plural specific indications, or combinations of plural different specific indications may be used.

A specific indication to be formed in the predetermined region of the CD-ROM 17 is formed in a visible shape and size and may be formed in, for example, a sector along the outer circumference of the CD-ROM 17.

INDUSTRIAL APPLICABILITY

As described above, the present invention is suitable for a security system of an information storage medium which stores information, such as a game program or others, and an electronic device which reads and uses the information stored in the information storage medium, and is especially useful as a security system for a game machine which optically reads a CD-ROM and program information stored in the CD-ROM.

I claim:

1. An electronic device comprising:

a medium mounting unit on which an information storage medium storing a game program is to be detachably mounted;

an optical detection unit which optically detects said information storage medium at an information region storing said game program and at a predetermined region different from said information region, wherein an authentic information storage medium should carry a predetermined specific indication formed on the predetermined region of such an area size and a property as optically detectable by an optical detection unit as well as visually recognizable to the eye as the specific indication;

a game control unit which controls a game in accordance with said game program stored in said information storage medium;

a storage unit which stores a reference signal corresponding to said predetermined specific indication; and a judging unit which compares a detected signal which is generated by detecting said predetermined region, with said reference signal stored in said storing unit to judge whether or not said predetermined specific indication is formed on said predetermined region.

2. An electronic device according to claim 1, further comprising an operation control unit which controls an operational state of said electronic device in accordance with a judgment result of said judging unit.

3. An electronic device according to claim 2, wherein the operation control unit stops operation of said electronic device when said judging unit judges that said predetermined specific indication is not formed on said predetermined region at said surface of the information storage medium.

4. An electronic device according to claim 1, further comprising an operation control unit which stops continued operation of said game program when said judging unit judges that said predetermined specific indication is not formed on said predetermined region at said surface of the information storage medium.

5. An electronic device according to claim 1 or 4, further comprising a display control unit which displays a predetermined warning on a monitor when said judging means judges that said predetermined specific indication is not formed on said predetermined region at said surface of the information storage medium.

6. An electronic device according to claim 1, further comprising a display control unit which displays a predetermined indication on a monitor when said judging means judges that said predetermined specific indication is formed on said predetermined region of the information storage medium.

7. An electronic device according to claim 1 or 4, wherein
said predetermined region is disposed at a first surface of said information storage medium opposite to a second surface thereof through which said information region is to be optically detected; and
said optical detection unit includes first detecting means which detects said information region through said second surface of the information storage medium, and second detecting means which detects said predetermined region from said first surface.

8. An electronic device according to claim 1 or 4, wherein
said predetermined region is disposed so as to be detected through a surface of the information storage medium, through which said information detection region is optically detected; and
said optical detection unit detects said information region and said predetermined region through said optical detection surface of the information storage medium.

9. An electronic device according to claim 1 or 4, wherein
said specific indication is of a nature that an unauthorized use of said specific indication on said information storage medium is legally prohibited.

10. An electronic device according to claim 9, wherein
said specific indication is a registered trademark.

11. An optically detectable disc-shaped information storage medium for use with an electronic device, comprising an information region in which a game program is stored in a manner optically detectable by an electronic device, said medium further comprising a predetermined region in which an authentication indication is formed in such a manner as to be visually recognizable to a human eye as well as optically detectable by an optical detection unit so that said authentication indication can be visually perceived by a human, as well as be optically detectable by said electronic device and compared with reference signals stored in said electronic device when said medium is mounted on said electronic device.

12. An optically detectable disc-shaped information storage medium according to claim 11, wherein
said predetermined region is disposed at a first surface of said information storage medium opposite to a second surface thereof through which said information region is to be optically detected by said optical detection unit.

13. An optically detectable disc-shaped information storage medium according to claim 11, wherein
said predetermined region is disposed so as to be detected through a surface of the information storage medium, through which said information region is optically detected.

14. An optically detectable disc-shaped information storage medium according to claim 11, wherein
said game program is written with pits optically detectable by the optical detection unit as digital information in said information region; and
said authentication indication is formed by using a group of pits in said predetermined region.

15. An optically detectable disc-shaped information storage medium according to claim 14, wherein
said predetermined region is disposed at an inner circumference of said information region.

16. An optically detectable disc-shaped information storage medium according to claim 14, wherein
said predetermined region is at an outer circumference of said information region.

17. An optically detectable disc-shaped information storage medium according to claim 11, wherein
said authentication indication is of a nature that an unauthorized use of said specific indication on said information storage medium is legally prohibited.

18. An optically detectable disc-shaped information storage medium according to claim 17, wherein
said authentication indication is a registered trademark.

19. An optically detectable disc-shaped information storage medium for use with an electronic device for executing a game program, comprising:
a transparent disc-shaped substrate;
an information storing region defined at a surface of said substrate with game program information stored with pits;
an image indication region defined at a region of said surface of the substrate different from said information storage region and formed with an authentication image indication by using a group of pits so as to be visually recognizable to the human eye as the authentication image indication as well as optically detectable as a signal indicative of the authentication image indication when said image indication region is optically detected by said electronic device for comparison of the detected signal with a reference data stored in said electronic device, said authentication image indication being of a nature that an unauthorized use of said authentication image indication on said information storage medium is legally prohibited;
a reflection layer covering said surface of the substrate; and
a protection layer covering said reflection layer.

20. An optically detectable disc-shaped information storage medium for use with an electronic device for executing a game program, comprising:
a disc-shaped substrate;
a first region defined on said substrate and storing game program information; and
an image indication region formed on said substrate with an indication of "SEGA" in such a manner as to be visually recognizable to the human eye as well as readable by said electronic device as a signal indicative of the indication of "SEGA" to be compared with a reference signal indicative of the indication of "SEGA" stored in said electronic device for authentication purposes when said medium is mounted on the electronic device.

21. An optically detectable disc-shaped information storage medium according to claim 20, wherein
said indication of "SEGA" is formed with an aggregation of pits so as to be visually recognizable to the human eye as the indication of "SEGA" as well as detectable by the electronic device as a signal indicative of the indication of "SEGA".

* * * * *